United States Patent
Schuster

(10) Patent No.: US 8,491,258 B2
(45) Date of Patent: Jul. 23, 2013

(54) METHOD FOR MANUFACTURING BY MOLDING A MACHINE STRUCTURAL ELEMENT HAVING AN ABRADABLE SURFACE, AND STRUCTURAL ELEMENT

(75) Inventor: Laurent Schuster, Erezée (BE)

(73) Assignee: Techspace Aero S.A., Herstal (Milmort) (BE)

( * ) Notice: Subject to any disclaimer, the term of this patent is extended or adjusted under 35 U.S.C. 154(b) by 858 days.

(21) Appl. No.: 12/644,133

(22) Filed: Dec. 22, 2009

(65) Prior Publication Data
US 2011/0002779 A1 Jan. 6, 2011

(30) Foreign Application Priority Data
Dec. 24, 2008 (EP) .................................... 08172881

(51) Int. Cl.
*F01D 11/12* (2006.01)
(52) U.S. Cl.
USPC ............................................ 415/173.4
(58) Field of Classification Search
USPC .................. 415/173.4, 174.4, 230; 277/415
See application file for complete search history.

(56) References Cited

U.S. PATENT DOCUMENTS

| | | | | |
|---|---|---|---|---|
| 3,547,455 A | * | 12/1970 | Daunt | 277/415 |
| 4,135,851 A | | 1/1979 | Bill et al. | |
| 4,460,185 A | * | 7/1984 | Grandey | 277/415 |
| 5,364,543 A | * | 11/1994 | Bosna et al. | 508/106 |
| 5,388,959 A | | 2/1995 | Forrester et al. | |
| 5,472,315 A | * | 12/1995 | Alexander et al. | 415/173.4 |
| 6,334,617 B1 | * | 1/2002 | Putnam et al. | 277/415 |
| 6,352,264 B1 | * | 3/2002 | Dalzell et al. | 277/415 |
| 6,844,392 B2 | * | 1/2005 | Suman | 524/588 |
| 2007/0003412 A1 | * | 1/2007 | Le Beiz et al. | 415/173.4 |
| 2010/0124616 A1 | * | 5/2010 | Rosenzweig et al. | 427/455 |

FOREIGN PATENT DOCUMENTS

| | | |
|---|---|---|
| DE | 3404479 A1 | 8/1985 |
| EP | 0219445 A1 | 4/1987 |
| EP | 0414570 A2 | 2/1991 |
| EP | 0437136 A2 | 7/1991 |
| GB | 791568 A * | 3/1958 |
| WO | 2005014979 A1 | 2/2005 |

OTHER PUBLICATIONS

Search Report, EP, Aug. 27, 2009.

* cited by examiner

*Primary Examiner* — Richard Edgar
(74) *Attorney, Agent, or Firm* — James E Walton; Richard G. Eldredge

(57) ABSTRACT

A method for manufacturing a machine structural element from a molded composite material includes manufacturing of an abradable layer made integrally from the material of the element. The method consists in adding a filler material to the resin at the surface to be made abradable, the filler material being able to disintegrate, such as e.g. transitioning to vapor phase, during the heat treatment of polymerizing the resin in order to create porosity inside the layer. The porosity thus created provides the relevant surface with properties of abradability.

21 Claims, 1 Drawing Sheet

METHOD FOR MANUFACTURING BY MOLDING A MACHINE STRUCTURAL ELEMENT HAVING AN ABRADABLE SURFACE, AND STRUCTURAL ELEMENT

This application claims priority under 35 U.S.C. §119 to European Patent Application No. 08172881.8, filed 24 Dec. 2008, titled "Method for Manufacturing by Molding a Machine Structural Element Having an Abradable Surface, and Structural Element," which is incorporated herein by reference for all purposes.

BACKGROUND

1. Field of the Application

The present application relates to a method for manufacturing a structural element from composite material having a friction surface, in particular a method for manufacturing by molding a structural element, such as a shroud of an axial turbine engine compressor. The invention also relates to a structural element, such as a shroud of an axial turbine engine compressor.

2. Description of Related Art

EP 0 219 445 discloses an inner shroud of a rectifier grid of a compressor of an axial turbine. The inner shroud is made of composite material and is composed of an inner ring having a laminated structure comprising layers of Kevlar® polyamide fibers embedded in an epoxy resin. The shroud also comprises a series of embossed sections designed to be glued to the inner ring and receive the blade roots. Such sections are also made of composite material consisting of glass fibers embedded in resin. A seal cooperating with two fins of the rotor is added to the interior surface of the inner ring. Together with the two fins, the seal forms a labyrinth seal. The construction of the composite inner shroud of this document is complicated because it requires manufacturing and assembling of the several elements composing it. Moreover, the teaching of this document is limited to an inner shroud.

U.S. Pat. No. 4,135,851 discloses an abradable lining of an outer shroud of a compressor or axial turbine. The lining is ring-shaped, designed to be inserted and then fastened, e.g. by gluing, to the shroud, which is probably metallic. The lining is formed from a ring-shaped support comprising corrugated metal sheets and a layer of abradable material fastened to the interior surface of the support. The support made of corrugated metal sheets allows for compensating certain deformations of the abradable layer, thus avoiding possible damages to the blade tips of the rotor and/or the shroud upon contact between these two elements during operation of the machine. This type of construction is also rather complicated as it implies making several elements and assembling them. Different methods for manufacturing abradable layers on a metal shroud of a turbine engine are known.

For instance, WO 2005/014979 discloses a method allowing for a metallic material as slurry to be applied to a surface by dipping, brushing, spraying, or vapor phase deposition, and for porosity to be controlled during curing. The material applied comprises plastic microbeads. The layer applied becomes porous during curing due to vaporization of the microbeads. However, this method is limited to forming an abradable layer on a metal shroud.

The teachings detailed before fail to offer a simple solution for making a composite structural element, such as a turbine engine shroud, having an abradable surface designed to frictionally engage a moving element. Indeed, the solutions offered by these teachings provide at least the separate application of an abradable layer of a kind which is different from the structural element and by an application method which is different from the manufacturing of the element as such. Moreover, a sand-blasting operation of the surface of the element on which the abradable material is to be applied is often necessary in order to ensure satisfactory adherence.

Although great strides have been made in the area of manufacturing structural elements, many shortcomings remain.

DETAILED DESCRIPTION OF THE PREFERRED EMBODIMENT

Figure 1:
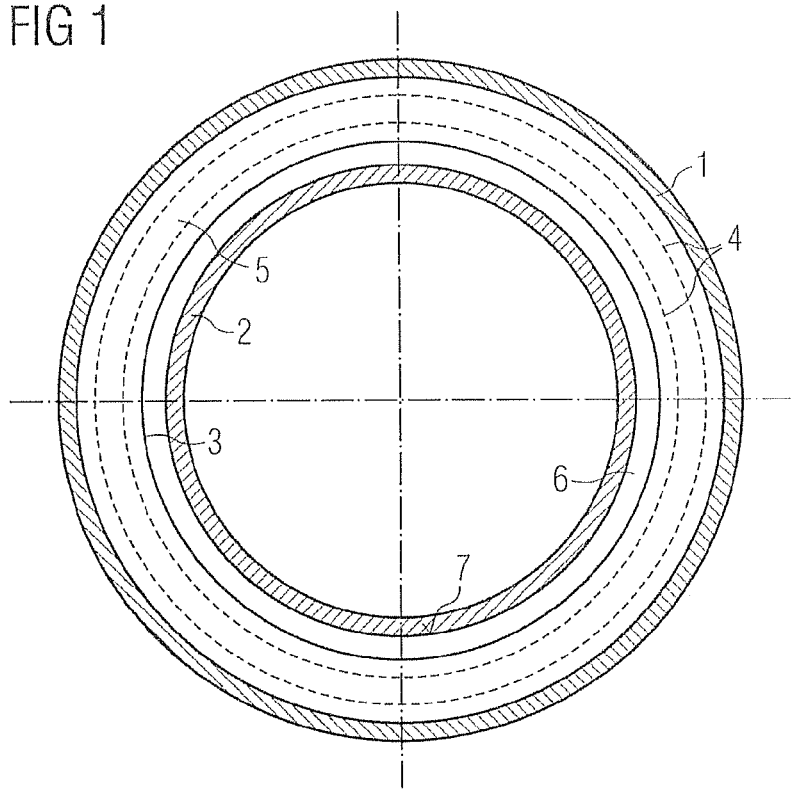
FIG. 1 is a schematic view of a ring-shaped structural element during manufacturing inside the mold thereof and designed to have an abradable surface at the interior periphery thereof according to the preferred embodiment of the present application.

The present application offers a solution, which is simpler and less costly, for making structural elements.

The present application includes a method for manufacturing by molding a machine structural element, preferably of an axial turbine engine stator, the structural element comprising a friction surface which may contact a moving element under certain conditions, comprising: setting up a mold; filling the mold with at least one paste-like or liquid material composing the structural element; adding at least one filler material at the friction surface; and heat treating the material by polymerization; the filler material being capable of creating porosity during or after the heat treatment on a thickness of the structural element, the porosity providing the surface with properties of abradability.

This method allows to provide the structural element with properties of abradability directly during manufacturing thereof. Thereby, the problems of separately manufacturing the structural element and an abradable element, and the assembling and surface treating associated therewith, when an abradable surface is added to a structural element, e.g. by gluing, can be overcome. The structural element thus manufactured moreover exhibits adhesion of the abradable layer equivalent to the cohesive force of the relevant material, which is in fact a solid material with a gradient of mechanical properties.

Preferably, the filler material comprises solid particles, and a membrane permeable to the resin and impermeable to the solid particles is placed inside the mold before adding the filler material so as to limit the presence of the filler material near the friction surface of the structural element.

Preferably, the membrane comprises fibers, preferably glass or carbon fibers.

Preferably, the filler material comprises at least one of the following materials: microbeads, preferably hollow, of glass; talc.

In the case of hollow glass microbeads, porosity is obtained automatically.

Preferably, the filler material is such that it disintegrates, preferably transitioning to vapor phase, during heat treatment.

Preferably, the filler material comprises at least one of the following materials: microspheres of thermoplastic material, preferably polytetrafluoroethylene (PTFE) or any other thermoplastic polymer adapted to transition to vapor phase during polymerization of the resin.

In the case of polyester microbeads of the type CAS 260-99-71-8, raising the temperature due to polymerization is sufficient for the disintegration of the filler material, thus creating the expected porosities.

Preferably, the filler material is fibrous, preferably metallic. This kind of filler material allows for the presence of the separating membrane to be avoided.

Preferably, the method comprises an additional step after the heat treatment consisting in dissolving the metallic fibrous filler material, preferably through application of an appropriate chemical bath.

Preferably, the fibers of the filler material are of aluminum, and the chemical dissolution bath is a strong alkaline bath, preferably of sodium hydroxide.

Alternatively, the fibers of the filler material are of copper, and the chemical dissolution bath is an acid bath, preferably of hydrochloric acid.

Preferably the structural element is an inner or outer shroud, preferably of a compressor.

Preferably, the structural element is composed of texturing fibers, preferably selected among the following: glass, carbon, metal; and thermosetting resin.

The present application also includes a structural stator element of an axial turbine engine having a rotor, with the structural element being made of thermosetting material and comprising an abradable surface designed for frictionally engaging an element of the rotor, the abradable surface being made integrally from the material of the structural element.

Preferably, the material of the structural element has porosity on a thickness starting from the surface, the porosity giving the surface at least partially the abradability thereof.

Preferably the structural element is an inner or outer shroud of a compressor of an axial turbine engine.

The above-mentioned characteristics of the present application, as well as others, will be more apparent from reading the following description of a sample embodiment while referring to the drawings attached.

The present application relates to forming a machine structural element from a composite material, and wherein the material of its abradable surface is made integrally from the material of the element as such. The composite element is typically shaped by molding by depositing mats of reinforcing fibers and injecting a resin into the mold and then by heat treating in view of polymerizing the resin. A filler material adapted to provide the surface with a property of abradability is added locally at the surface when the fibers and the resin are introduced. The idea of abradability is comparable to a surface being capable of crumbling into very fine dust in case of friction with an element moving relatively thereto. Typically, such a property can be reached when some porosity is reached in the material composing the relevant surface.

The filler material is adapted to generate some porosity inside the material composing the structural element in view of providing the surface with properties of abradability. This capacity of the filler material to generate porosity is related to the chemical composition thereof, the physical structure as such, or else a combination of both.

Indeed, the filler material may be a chemical compound such that it undergoes a change of state, like liquefaction, vaporization, or even sublimation, starting from a given temperature to be reached during the heat treatment for polymerizing the material composing the structural element. This change of state of the filler material will generate a network of pores starting from the location of the filler material up to the surface. This network will create the porosity necessary for the abradability of the surface.

The filler material can also have a structure such it forms a potential network of microchannels, such as for instance fibers, embedded in the material at surface level. This network will then be "caught" within the material after polymerization, and will be able, after possible chemical elimination, to provide the superficial material area with porosity.

The filler material can also be a combination of both types, such as for instance hollow polyester microbeads, i.e. adapted to transition to gaseous phase. During polymerization of the resin of the structural element, the envelop of the microbeads will transition to vapor phase, and while freeing the micro air bubbles comprised within the hollow microbeads, will increase the total porosity volume inside the material.

Figure 2A:
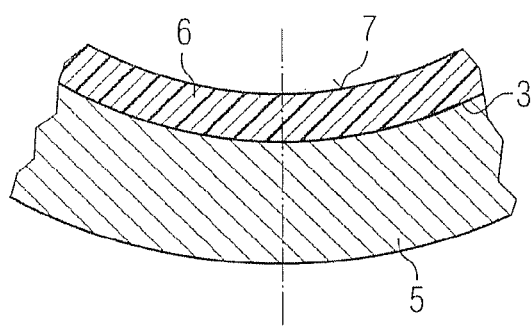
FIG. 2a is a sectional view of a portion of the ring of FIG. 1 before heat treatment.
Figure 2B:
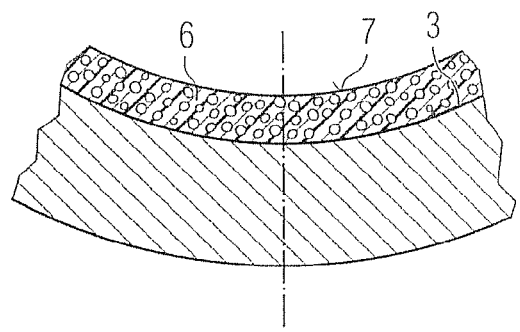
FIG. 2b is a sectional view of a portion of the ring of FIG. 1 after heat treatment and possibly after chemical dissolution.

A sample embodiment of the present application is illustrated in FIGS. 1, 2*a*, and 2*b*. The figure schematically illustrates a sectional view of an outer shroud of an axial turbine engine compressor during the shaping phase. An outer shroud of a turbine engine compressor generally has a structural ring-shape adapted to be assembled with other components of the stator of the compressor. The internal surface thereof is the stator or casing part for the corresponding moving wheel of the compressor. The moving wheel is composed of a row of blades on the periphery of the rotor composing together with the stator rectifier grid immediately downstream one stage of the compressor. The inner surface of the shroud encloses the rotor blades and is likely to contact the ends thereof under certain operating conditions. The inner surface of the shroud will thus have properties of abradability in view of avoiding any major deterioration of the blades or the shroud in case of contact. The mold comprises an exterior part 1 for the exterior surface of the shroud and an interior part 2 for the interior surface of the shroud. The shroud is typically composed of composite material comprising reinforcing fibers such as glass, carbon, and/or metal fibers and a thermosetting resin.

Manufacturing of the composite shroud is done as follows. One or more successive mats of reinforcing fibers 4 are placed inside the mold. A transition mat 3 is then put in place. Advantageously, this mat is of the same kind as the reinforcing mats 4, but plays a special part here in as far as the mat 3 forms an annular physical separation in the thickness of the shroud. The resin, typically a thermosetting resin known to the one skilled in the art, such as an epoxy resin, is injected into the mold. A filler material adapted to change its state during the subsequent heat treatment is also injected. It can be mixed directed with the resin so that it is injected together with the resin. It can also be injected separately before injecting the resin, by being retained by the transition mat 3, or at the end of the resin injecting step, or else it can be injected together with the resin only at the end of the injection process. The injection of the filler material is done starting from the interior mold in order to fill area 6 of the shroud. Injection techniques for several components known to the one skilled in the art may be applied in view of obtaining stratification or at least a gradient of concentration of the filler material from the interior surface 7.

The filler material may be of a different kind, such as for instance hollow glass or talc microbeads—intrinsic porosity of the filler material—or microspheres of PTFE or any other thermoplastic polymer adapted to transition to vapor phase during reticulation of the resin—porosity generated during polymerizing heat treatment. The grain size or size of particles is important as well as the fineness of the meshing of the mat 3 because both are chosen so that the mat is substantially impermeable to particles of the filler material. Matting 3 also allows for selective partitioning of the shroud volume according to the thickness thereof. The filler material will thus concentrate in a layer starting from the contact surface 7 the thickness of which will be determined by the position of the matting 3. The latter forms a wall which is porous or permeable to the resin, but not to the particles of the filler material.

Heat treatment is then applied so as to harden the resin of the shroud by polymerization. During this heat treatment, the material of the filler particles will vaporize, thus creating a cloud of gaseous inclusions inside the layer 6. It will be important to properly select the material and control the rise of temperature so that the resin has already reached some degree of viscosity before the change of state, in particular the transition to vapor phase, in order to avoid excessive degassing which might lead to insufficient porosity.

FIG. 2a is a sectional view of a segment of the shroud of FIG. 1 before polymerization. Two distinct areas 5 and 6 can be seen, delimited by the matting 3 acting as a membrane. Area 5 contains the resin and the fiber mattings, and area 6 contains resin enriched with filler particles. FIG. 2b is a view corresponding to FIG. 2a after polymerization. Porosity in area 6 is illustrated by the small resin-free spheres. They correspond to the filler particles, which have vaporized and thus grown. They have created a cloud of gaseous inclusions within the layer 6 from the matting 3 to the surface 7, providing said surface and the wear layer thereof with properties of abradability. Other types of filler material may be envisaged while following the same principle of creating porosity.

As already mentioned before, a filler material forming a network of microchannels inside the resin, which is chemically stable during polymerization and adapted to be subsequently removed, can also be envisaged. Typically, metal fibers could be used, e.g. aluminum or copper fibers. In this case, it is no longer necessary to provide a partitioning wall, but it is sufficient to place the relevant fibers in the area designed to be abradable. The metal fibers will remain chemically stable during heat treatment, and they should then be removed by dissolution in an appropriate bath. Aluminum fibers could be dissolved in a strong alkaline bath, e.g. a bath of sodium hydroxide. Copper fibers could be dissolved in an acid bath, e.g. a bath of hydrochloric acid. Removal of the filler material will generate porosity in the resin and provide it with properties of abradability.

The example described in the figures relates to an outer shroud of an axial turbine engine compressor. The element is not necessarily circular, e.g., it would be possible to manufacture a segmented shroud, i.e., a series of shroud segments. It is clear that the scheme described is applicable to any structural element or machine component which is to have at least one surface with properties of abradability.

I claim:

1. A method for manufacturing a machine structural element having a friction surface, the method comprising:
    setting up a mold;
    filling the mold with at least one material from which the structural element is formed;
    adding at least one filler material locally to said material at the friction surface, the filler material being capable of creating porosity on a thickness of the structural element, with the porosity providing the friction surface with properties of abradability, said step of adding at least one filler material being carried out before, during and/or after the mold filling step; and
    heat treating the material by polymerization.

2. The method according to claim 1, wherein the material from which the structural element is formed is paste-like.

3. The method according to claim 1, wherein the material from which the structural element is formed is liquid.

4. The method according to claim 1, wherein the filler material comprises:
    solid particles.

5. The method according to claim 4, further comprising:
    placing a membrane permeable to resin and impermeable to solid particles inside the mold before adding the filler material, so as to limit the presence of the filler material near the friction surface of the structural element.

6. The method according to claim 5, wherein the membrane comprises at least one of:
    glass fibers; and
    carbon fibers.

7. The method according to claim 1, wherein the filler material comprises at least one of:
    hollow glass microbeads;
    talc microbeads;
    microspheres of thermoplastic material adapted to transition to vapor phase during polymerization of the resin; and
    polytetrafluoroethylene.

8. The method according to claim 1, wherein the filler material disintegrates during heat treatment.

9. The method according to claim 8, wherein the filler material disintegrates by transitioning to a vapor phase during heat treatment.

10. The method according to claim 1, wherein the filler material is fibrous.

11. The method according to claim 10, wherein the filler material is metallic.

12. The method according to claim 11, further comprising:
    dissolving the metallic fibrous filler material through application of an appropriate chemical bath after the heat treatment.

13. The method according to claim 12, wherein the metallic fibrous filler material is aluminum, and the chemical dissolution bath is an alkaline bath.

14. The method according to claim 13, wherein the alkaline bath is sodium hydroxide.

15. The method according to claim 12, wherein the metallic fibrous filler material is copper, and the chemical dissolution bath is an acid bath.

16. The method according to claim 15, wherein the acid bath is hydrochloric acid.

17. The method according to claim 1, wherein the structural element is a shroud of a compressor.

18. The method according to claim 1, wherein the structural element is comprised at least of fibers of:
    glass;
    carbon; and/or
    metal; and
    of thermosetting resin.

19. A structural stator element of an axial turbine engine having a rotor, comprising:
    a shroud made of a thermosetting material; and
    an abradable surface for frictionally engaging an element of the rotor, the abradable surface being formed integrally with the material of the shroud and forming an exterior surface of the shroud;
    wherein the material of the shroud has a porosity locally on a thickness starting from the exterior surface of the shroud, the porosity giving the exterior surface at least partially the abradability thereof.

20. The structural stator element according to claim 19, wherein the shroud is an inner shroud of an axial turbine engine compressor.

21. The structural stator element according to claim 19, wherein the shroud is an outer shroud of an axial turbine engine compressor.

\* \* \* \* \*